March 16, 1954 — J. W. SHEFFER ET AL — 2,671,957
METHOD OF ASSEMBLING RAILROAD CARS
Filed July 31, 1948 — 14 Sheets-Sheet 1

Inventors
John W. Sheffer,
Edmund A. Watson,
Arthur C. Schanz.
By George R. Ericson
ATTORNEY March 16, 1954 J. W. SHEFFER ET AL 2,671,957
METHOD OF ASSEMBLING RAILROAD CARS
Filed July 31, 1948 14 Sheets-Sheet 3

Inventors
John W. Sheffer,
Edmund A. Watson,
Arthur C. Schanz.

By

George R. Ericson
ATTORNEY

March 16, 1954 J. W. SHEFFER ET AL 2,671,957
METHOD OF ASSEMBLING RAILROAD CARS
Filed July 31, 1948 14 Sheets-Sheet 6

Fig. 11.

Inventors
John W. Sheffer,
Edmund A. Watson
Arthur C. Schanz
By
George R. Ericson
ATTORNEY March 16, 1954   J. W. SHEFFER ET AL   2,671,957
METHOD OF ASSEMBLING RAILROAD CARS
Filed July 31, 1948   14 Sheets-Sheet 7

March 16, 1954 J. W. SHEFFER ET AL 2,671,957
METHOD OF ASSEMBLING RAILROAD CARS
Filed July 31, 1948 14 Sheets-Sheet 10

Fig. 18.

Inventors
John W. Sheffer,
Edmund A. Watson,
Arthur C. Schanz.

By George R. Ericson
ATTORNEY

March 16, 1954  J. W. SHEFFER ET AL  2,671,957
METHOD OF ASSEMBLING RAILROAD CARS
Filed July 31, 1948  14 Sheets-Sheet 12

Inventors
John W. Sheffer,
Edmund A. Watson,
Arthur C. Schanz.

By George R. Ericson
ATTORNEY

March 16, 1954 J. W. SHEFFER ET AL 2,671,957
METHOD OF ASSEMBLING RAILROAD CARS
Filed July 31, 1948 14 Sheets-Sheet 13

Inventors
John W. Sheffer,
Edmund A. Watson,
Arthur C. Schanz.
By
George R. Ericson
ATTORNEY Patented Mar. 16, 1954

2,671,957

UNITED STATES PATENT OFFICE 2,671,957

METHOD OF ASSEMBLING RAILROAD CARS

John W. Sheffer, Glen Ridge, Edmund A. Watson, Ridgewood, and Arthur C. Schanz, Glen Ridge, N. J., assignors to American Car and Foundry Company, New York, N. Y., a corporation of New Jersey Application July 31, 1948, Serial No. 41,866

2 Claims. (Cl. 29—367)

This invention relates to the method of and apparatus for fabricating sheet metal railroad cars.

An object of the invention resides in the method of fabricating a sheet metal railroad car on an assembly line.

Another object of the invention resides in the method of holding and manipulating a tacked together sheet metal car at three stations whereby all of the final welding of the tacked together car can take place in the direction of gravity.

Still another object of the invention resides in the method of applying assembled side units to the ends and underframe of a railroad car.

These and other objects of the invention will be apparent to those skilled in the art from a study of the following description and accompanying drawings, which.

This invention provides a method and apparatus for assembling the component parts of metal railroad cars on an assembly line. A 70 ton capacity hopper car A has been selected for the purpose of illustrating and describing the invention.

The assembly line is accommodated on a suitable flooring 50 on which a pair of tracks 20 forming the assembly line are suitably mounted. The component parts of the car are assembled in units or in separate pieces, as the case may be, and are moved transversely to the places along the endless track line where they are to be assembled to form the car structure as will be described. These places are indicated at stations S1, S2, S3, S4, S5, S6, S7, S8, and S9, see Figures 1 to 4.

In advance of station S1 a pair of trucks 5 having wheels 6 are rolled on to the tracks and a preassembled underframe unit is lowered over the trucks and secured thereto in a conventional manner. This underframe unit consists of a center sill weldment 1 on which are fixed the usual bolsters 2, cross bearers 3 and sub-side sill 3a used in the manufacture of hopper cars.

The underframe is then rolled along the line to station S1 where the hopper chute units 11 are tack welded to the center sill and the cross bearers. The car structure is next moved along the line to station S2 where preformed units consisting of a cross ridge 4 and ridge angle brackets 4' are next assembled on the car structure. The cross ridges are tack welded to the center sill and to the upper edges and end walls of the hopper chutes. Such car structure is next moved to station S3 where the bottom slope flooring is applied. The upper face of bolster beams 2 extend at an angle and receive splice plates 15 overlying the junction between the two sections of the floor sheets 7. The floor sheet sections and the underlying splice plate are welded together prior to their application to the car structure and are applied to the car with the splice plate on the upper face 14 of the beams 2 to which they are tack welded. The end walls are also tack welded to the upper edge of the top slope floor sheet section 7. At this station floor sheet angle braces 16 are welded at their upper ends to the floor sheets and at their lower ends to the center sill structure.

The car structure is next moved on to station S4 where the preformed end wall units 8 are tack welded in position. These end wall units include vertical posts 9 extending beneath the end wall and joined at their lower ends by sill 9a. The lower ends of end posts 9 are tack welded to sub-side sills 3a. The assembly is next moved on to station S5 where preformed side wall units 12 are applied and tack welded at the corners to the bolsters, hopper chutes, and the end wall units.

These side wall units have a lower rail 17, top cord angle 18 and stakes 19. A series of panels are first welded together, then the top cord angles are welded on the panel unit and after that the stakes 19 are welded in place. These side wall units are in this manner permanently assembled prior to their application to the sides of the car structure. At this station, corner angle brackets 13 are welded to the adjacent ends of the side and end wall units.

This car structure is now ready to be moved along the assembly line to station S6 where top spacer devices 21 are applied. These devices have clamp portions engaging the upper cord angles of the side wall assemblies and an adjustable rod means extending between the clamps. Spacer devices 21 are supplied to the top of the car side walls and serve to accurately maintain the transverse dimension at the intermediate portion of the top of the car during further travel of the car on the assembly line.

Apparatus shown in Figures 18 to 21 is located at station S6 and is utilized for the purpose of forcing the side units in their final squared-up position for further tack welding operations. Such apparatus includes a stationary framework consisting of two rows of longitudinally spaced upright columns 22, each line of columns being connected at their tops by girders 23 and opposite lines of columns being connected by top cross girders 24. This framework carries fixture means in the form of longitudinal beams 25 on which rollers 26 and guides 26' are mounted for engaging columns 22. These fixture beams 25 extend one along the inside of each line of vertical columns 22 and are movable vertically into various positions that are necessary for clamping the side wall structure of the car during the tack welding at this station. The beams are raised and lowered by an electric hoist 27 having a drum 28 on which cables 29 are wound and unwound. These cables extend over pulleys 30 and 31 and are attached to the end portions of beams 25. Counterweights 31 are carried by cables 32 extending over drums 33 mounted on the center upright girders 22 with the cables being attached at their other end to the beams. During vertical adjustment of the fixture beams, rollers 26 and guides 26' will move along the columns 22 maintaining the beams in the same vertical plane regardless of their adjusted position.

Fixture beams 25 are parallel and are spaced further apart than the width of the car. The fixture beams carry a plurality of jack clamping devices 34 connected to pistons 35 in cylinders 36 that are fixed on carriers 37. These carriers are supported by rollers 26 lying to the outside of the upper beam flange 38 and guide and lock means 39 engaging the outside face of the lower flange 40 of the fixture beam. The roller and the guide means on the clamp or jack carrier 37 permit movement of the jacks horizontally along the beam into desired position without changing the distance between the jack and the inner face of the fixture beam and guide means 39 are clamped on the beam by wrenches 39'. Cylinders 36 have air lines 41 and 42 connected with opposite ends thereof and such lines connect respectively with manifolds 43 and 44 carried on the underside of the beam. These manifolds are connected with a suitable source of air pressure and a conventional valve is employed to control air flow to the cylinders so that the jacks 34 will move inwardly similarly to engage the side wall units of the car or to be released therefrom.

The car with the side wall units tack welded at the corners is pushed into the frame work at station S6 where the beams are moved to several vertical positions for further tack welding the side wall units to other component parts of the structure. For example, at this station the sides are tack welded to the ends of the cross ridges, to the body bolsters and to the hopper chutes. This tack welding of the side units, while held in longitudinal alignment by pneumatic jacks, will square up the sides with the ends in desired relationship. At this point all of the component parts of the car are tacked together in their desired relationship and the car is now ready for final welding.

Final continuous arc weldment of the tacked component parts of the car takes place at stations S7, S8 and S9 in the assembly line and at each of such stations there is a rotatable jig structure B in which the car is firmly held and shifted so that all welding can be made by the operators in the direction of gravity.

Figure 9:
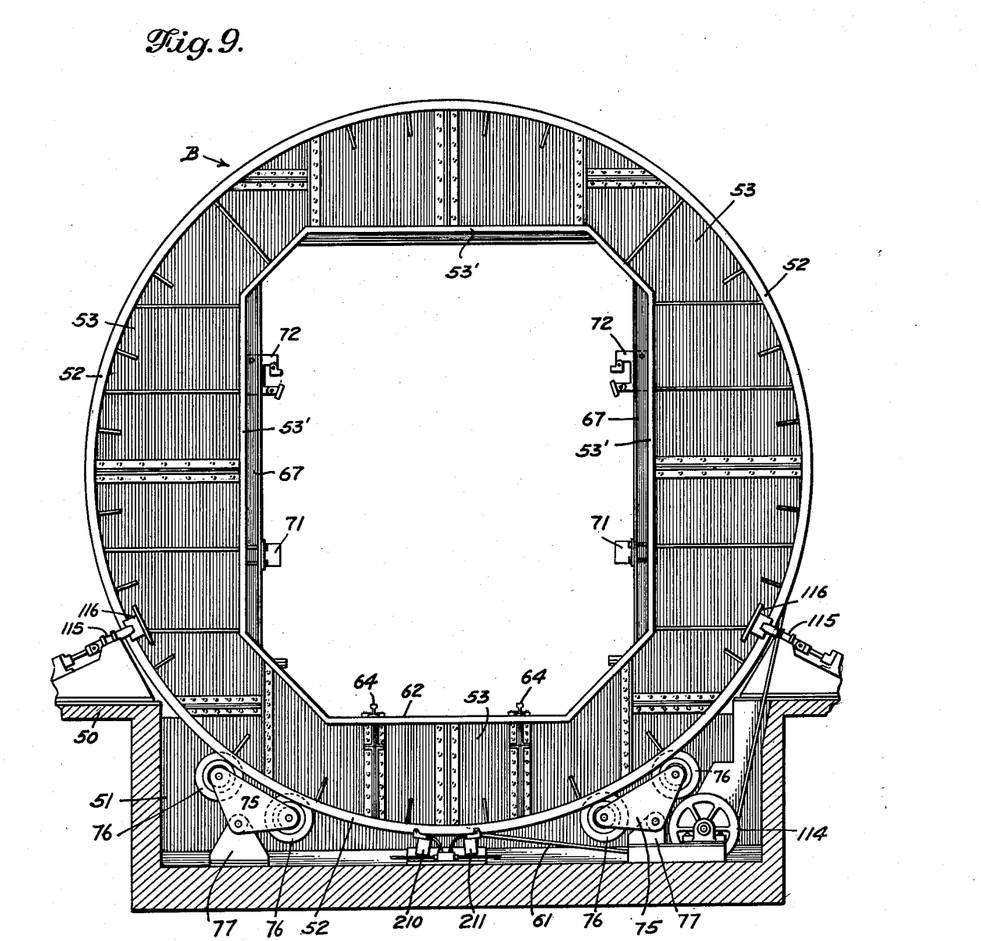
Figure 9 is an end view of one of the jigs taken on line 9—9 of Figure 10.
Figure 10:
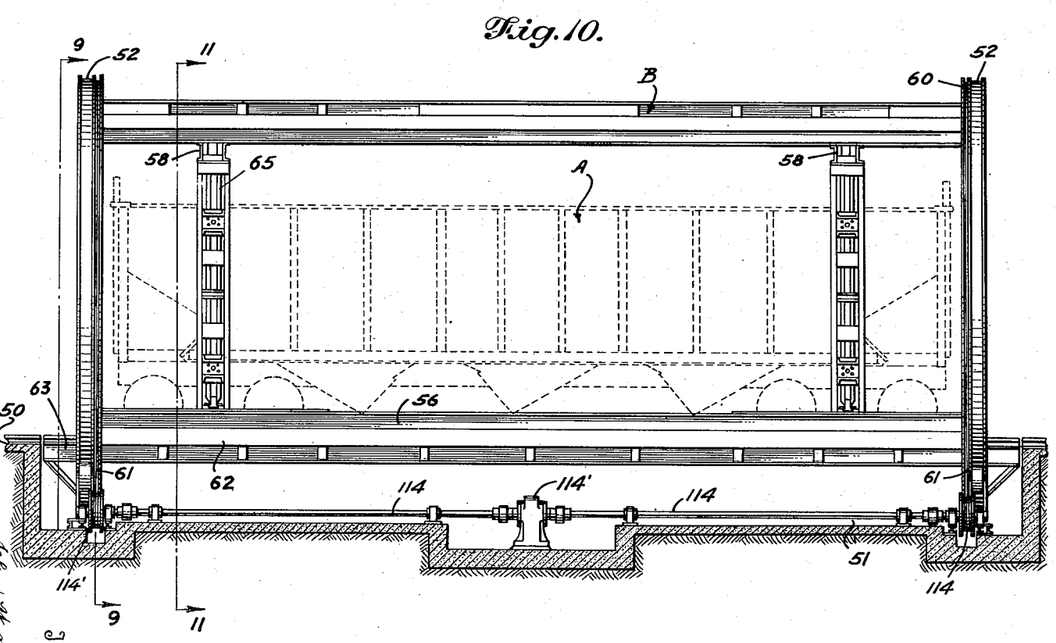
Figure 10 is a side elevational view of one of the rotary jigs.
Figure 11:
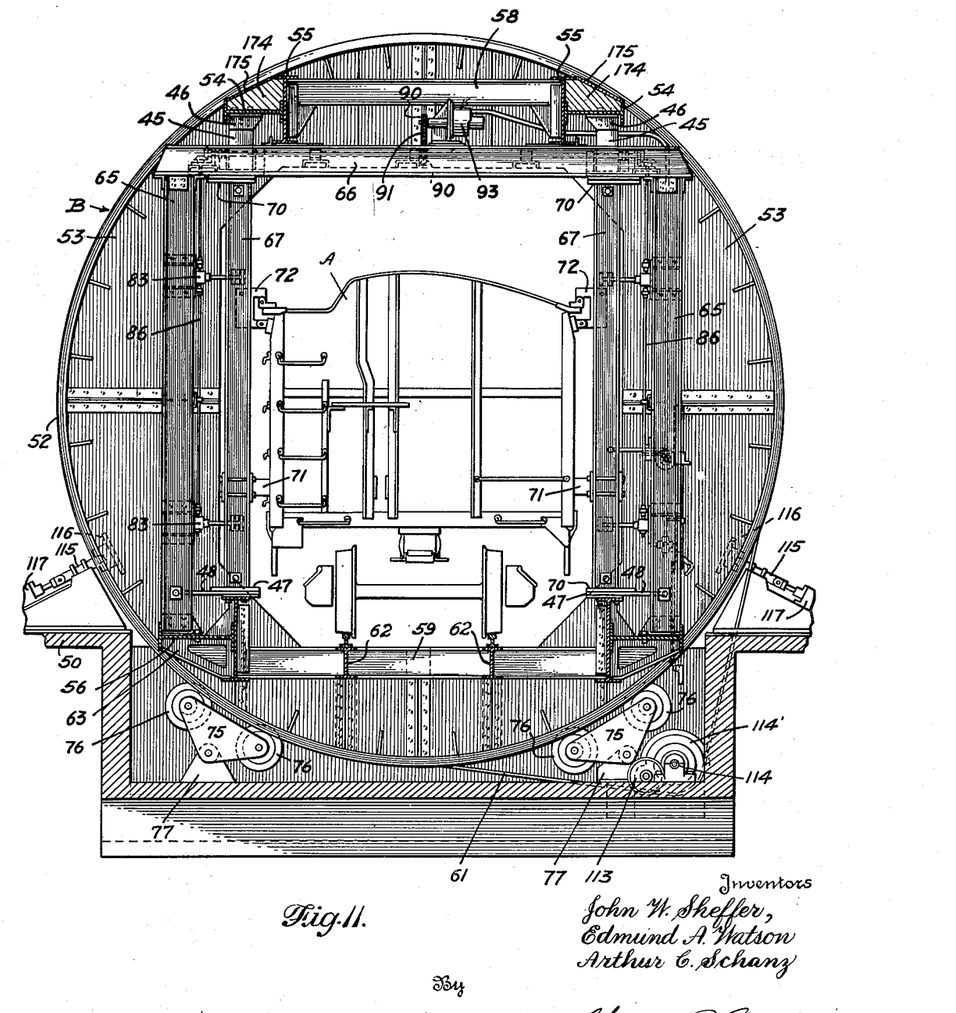
Figure 11 is a sectional view of one of the rotary jigs taken on line 11—11 of Figure 10.

These jig structures are similar and a description of one will suffice for all. The base or floor 50 at each of these stations is formed with a pit 51 into which the jig structure extends and is rotatably mounted. Jig B has a skeleton framework comprising an outwardly flanged ring 52 at each end with an interior frame 53' and connecting flange sections 53. This frame-work further includes pairs of longitudinally extending upper girders composed of I beams 54 and 55 and pairs of longitudinally extending lower girders composed of I beams 56 and 57. Upper cross girders 58 extend between and are secured to beams 55, lower flooring cross girders 59 extend between and are secured to beams 57 and lower longitudinal flooring girders 62 are secured to girders 59. The longitudinally extending sets of beams 54, 55 and 56, 57 extend at an angle of 90° and are secured together and such beams are secured at their ends to the rib sections 53 of the rings. Gussets 63 connect the two beams in the upper and lower girders. To the inside of each ring structure is fixed a drum ring 60 for receiving cables 61 forming a part of the mechanism for rotating the jig. Sections of track rails 20 are supported on lower cross and longitudinal beams 59 and 62.

Figures 12, 13:
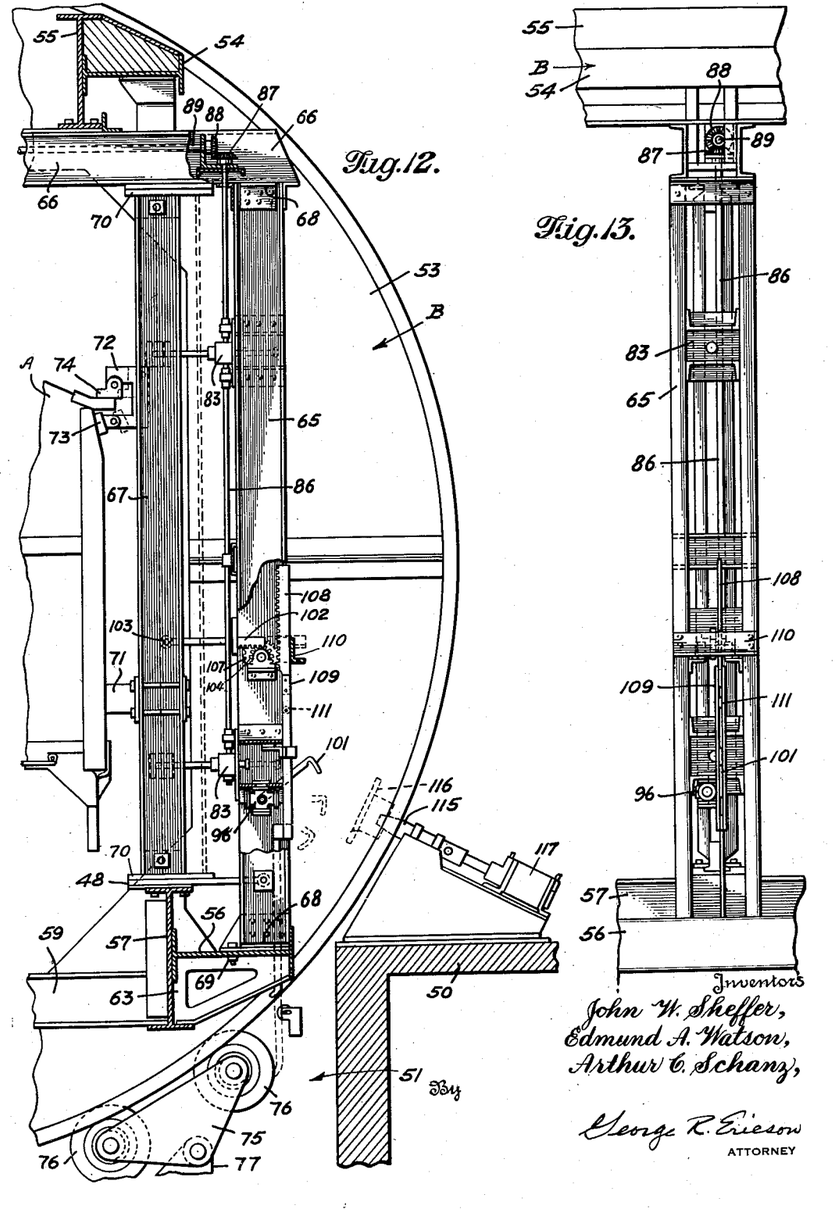
Figure 12 is a partial enlargement of Figure 11 showing the jig framework, clamping fixture and control mechanism for the clamping mechanism.
Figure 13 is a side elevational view of the structure shown in Figure 12.
Figure 14:
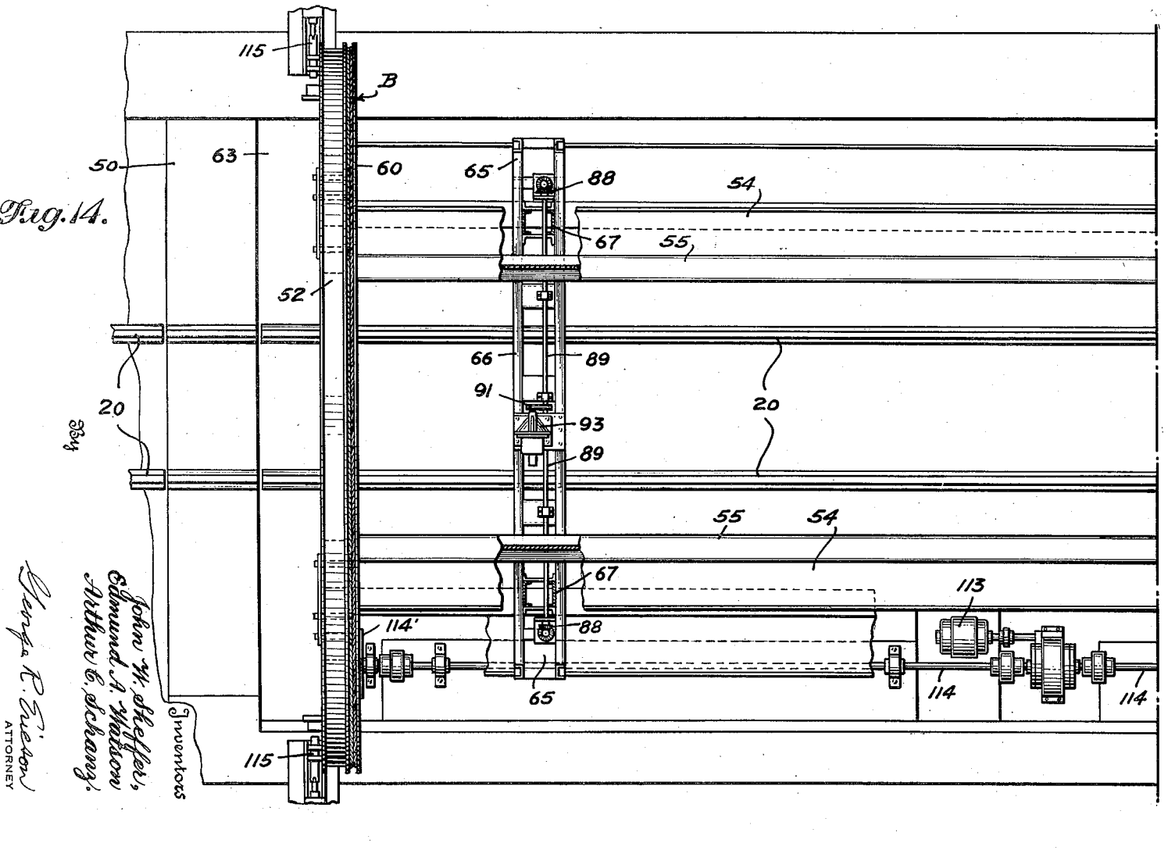
Figure 14 is a top plan view of the left hand end of the jig shown in Figure 10.

The jig framework so far described provides a mounting for a fixture in which the car is to be clamped in position for final welding. This fixture is composed of skeleton framework including vertical columns 65, upper cross girders 66 and vertical clamp carrying beams 67. Suitable bearing cap structures 68 are fixed to the lower ends of the columns 65 and bear against the lower beams 56 to which they are detachably secured by bolt and nut means 69. These columns 65 are secured at their upper ends to the cross girders 66 that slidably engage the lower flanges of the longitudinal beams 55 and have stub columns 45 attached thereto. Stub column caps 46 are detachably secured to beams 54. Thus, the fixture can be adjusted longitudinally of the jig framework to suit different car lengths encountered in manufacture. Beams 67 have upper and lower bearing cap means 70, the upper ones of which slidably engage bearing surfaces on the cross girders 66 and the lower ones of which engage shoes 48 bearing on beams 57 and attached to columns 65.

Means for clamping the car squarely in the jig structure is carried by the transversely adjustable beams 67. There are preferably four of these clamp beams 67, located two on opposite sides of the car and adjacent the ends thereof with the beams at opposite car sides in alignment. The clamps on each beam are similar and include a lower clamp member 71 and an upper pivoted C clamp 72 on which is pivotally mounted shoe 73 and shoe 74. The lower and upper clamps 71 and 72 are adjustable vertically and suitably secured to the beams.

The mounting for the jig structure is located in pit 51 and includes cradle devices each having a centrally pivoted carrier 75 with a roller 76 at each end thereof. The carriers are mounted on base members 77 fixed in the bottom of the pit 51. The rollers engage in the flange rings 52 and are self-positioning therewith because of their pivotal mounting.

Figures 15, 16, 17:
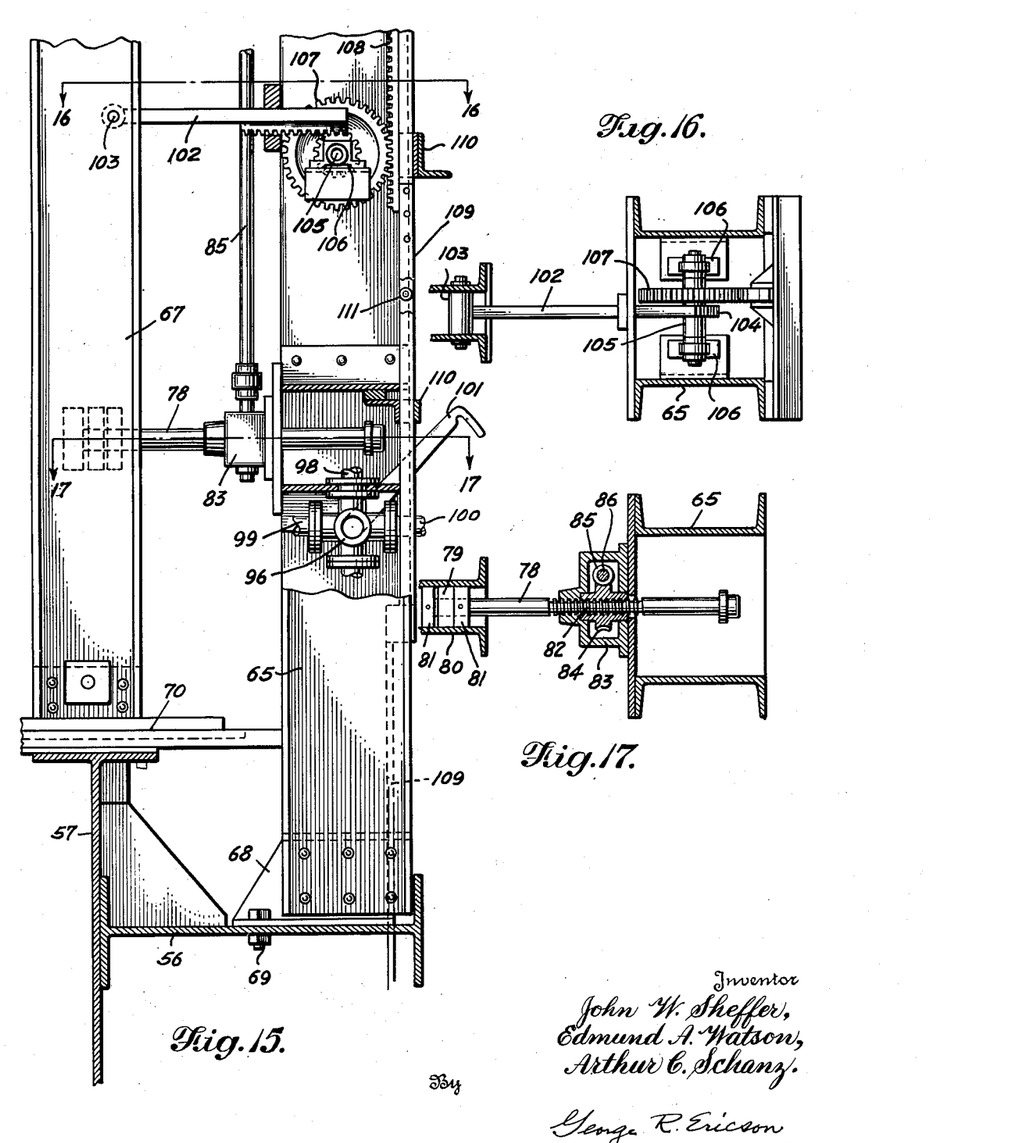
Figure 15 is an enlarged view of a fragment of the structure shown in Figure 12.
Figure 16 is a sectional view taken on line 16—16 of Figure 15 showing the control mechanism for the jacking valve and electric rotor system.
Figure 17 is a sectional view taken on line 17—17 of Figure 15 showing a portion of the clamp jacking mechanism.
Figure 18:
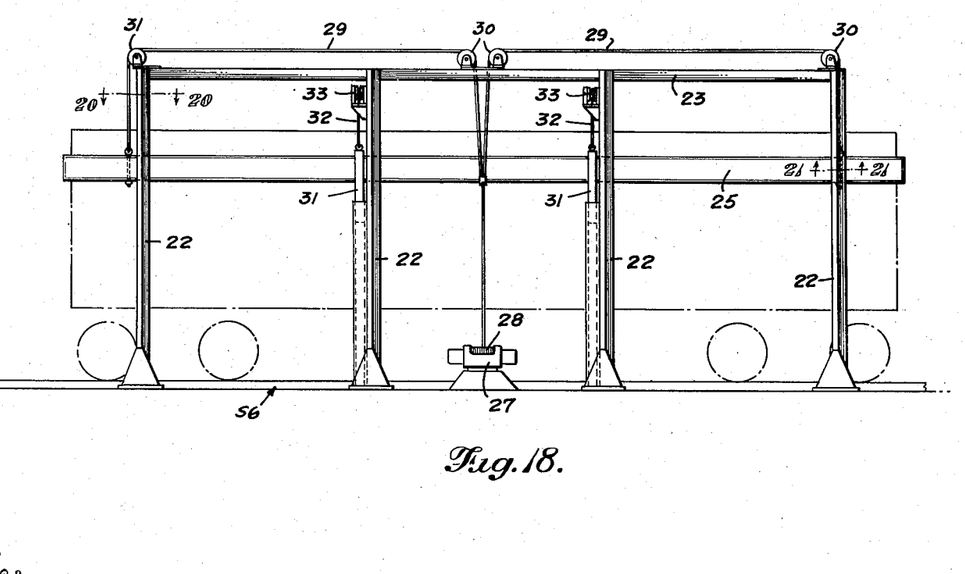
Figure 18 is a side elevational view of the mechanism located at the station where the sides are applied to the car.
Figure 19:
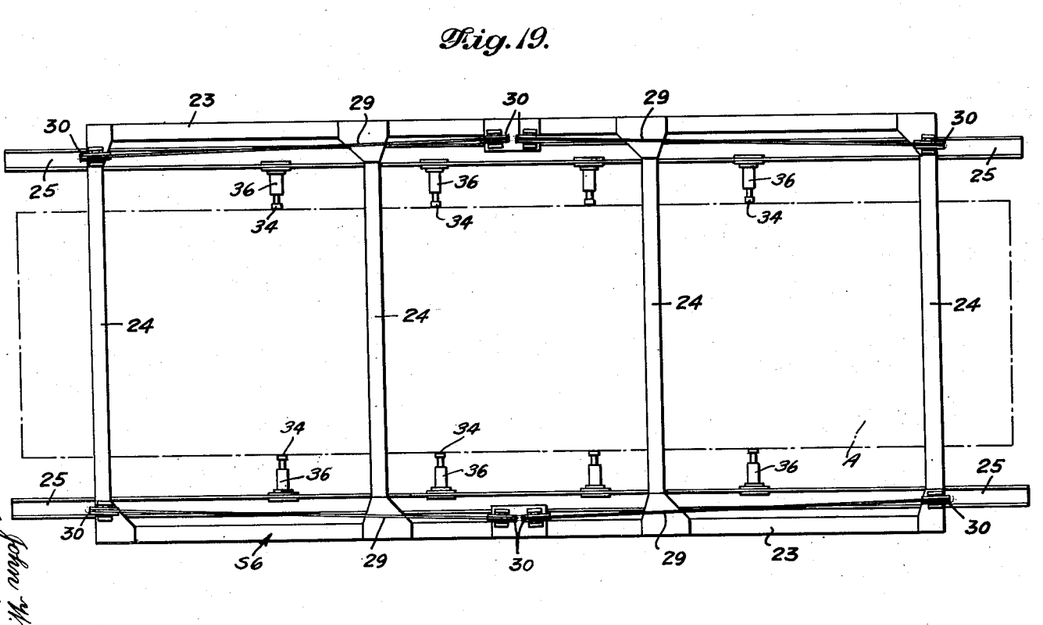
Figure 19 is a top plan view of the mechanism shown in Figure 18.
Figure 20:
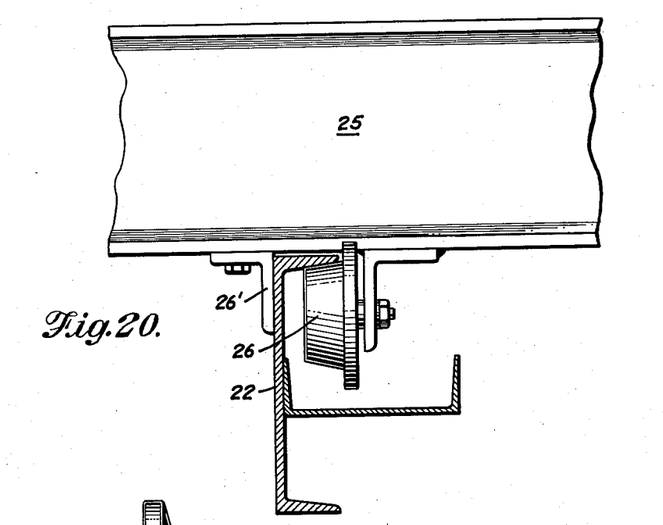
Figure 20 is a sectional view taken on line 20—20 of Figure 18.
Figure 21:
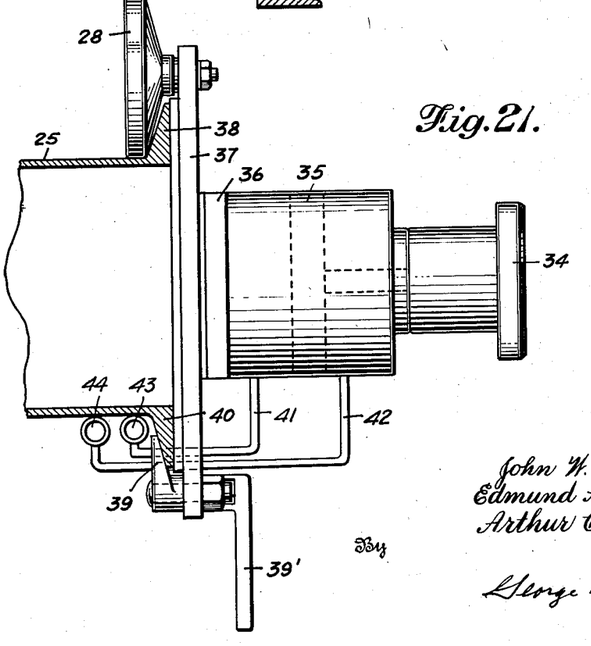
Figure 21 is a sectional view taken on line 21—21 of Figure 18.

Associated with the adjustable car carrying fixture is mechanism for shifting the clamp carrying beams toward and away from the car sides. Each beam 67 has two similar actuator or jacking devices for transverse shifting thereof, see Figure 17, consisting of a rod 78 extending through collar 79 on an anchor member 80 fixed to the beam. Abutments 81 are pinned to the rod at each end of the collar. Rod 78 has a worm gear portion 82 extending through casing 83 fixed on beam 65. Hollow worm gear 84 is rotatably mounted in casing 83 and drivingly engages the worm gear portion of the rod and is driven by gear 85 fixed on driven shaft 86. Gear 87 at the upper end of the driven shaft 86 is actuated by gear 88 on drive shaft 89, the drive shaft extending across and being mounted on cross girder 66. Each drive shaft has thereon a sprocket 90 driven by a chain belt 91 driven by drive sprocket 92 fixed on the drive shaft of an air motor 93. Thus, at each end of the jig there is an air driven mechanism for operating the jacking device and each of the air motors are connected with a suitable source of air supply. The air motors have a conventional pressure responsive air shut-off valve to regulate the jacking pressure exerted against beams 67.

Figure 5:
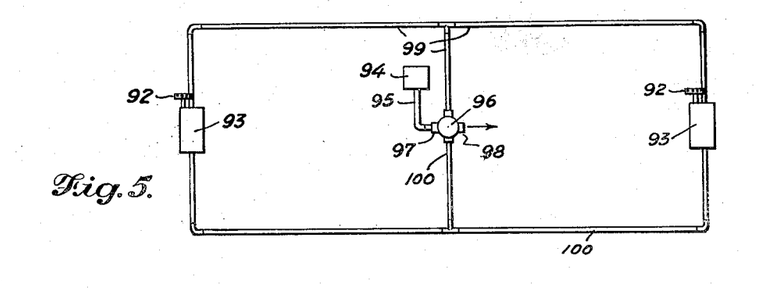
Figure 5 is a diagrammatic view of the air motor and control of the clamp jacking mechanism.

Control of the air supply for the air motors 93 is shown in Figure 5. A suitable source of air 94 under pressure is connected by line 95 with a four-way valve 96 through inlet port 97. The valve has an exhaust port 98 and also two lines 99 and 100 leading therefrom. The line 99 is connected to drive the air motors in one direction and the line 100 is connected to drive the motors in the opposite direction. There is a neutral position of the valve in which air supply to the motors is cut off. When the valve is turned to connect either line 99 or 100 with the air motors, then the other line will exhaust through valve port 98.

Valve 96 is turned by means of a manually operated handle 101 that is also automatically controlled by mechanism that limits retraction of the beams 67 and also controls the mechanism for rotating the jig. Such control mechanism includes rack 102 pivoted at 103 to one of the beams 67, see Figure 16, and meshing with gear 104 on shaft 105 mounted on bearing 106. Gear 107 is also fixed on shaft 105 and meshes with a rack 108 fixed to a control rod structure 109 slidably mounted in guides 110 fixed on a column 65. Control actuator roller 111 is carried by rod structure 109 in a relation to move handle 101 to valve shut-off position when the beams 67 have been moved away from clamping position with the car at a point limiting retraction movement of the beams 67 so that they will not crush gear housings 83. The gearing between rack 102 and the rod structure 109 steps up the movement of rack 108 relative to the rack rod 102 and the roller 111 is located on rod 109 in a proper position to move the handle 101 downwardly to shut off the valve 96 as the beams 67 approach gear housings 83. In the operation of the clamping mechanism, handle 101 when in horizontal position shuts off air flow through the valve. In order to operate the jacking mechanism to shift the beams 67 to clamp the car, handle 101 is moved downwardly from horizontal position thereby opening line 99 to one side of the air motor and connecting line 100 leading to the other side of the air motors with the valve exhaust outlet 98. As the beams 67 move toward the car, clamps 71 and shoes 73 of clamps 72 will engage the side units of the car. Clamps 72 will be rocked, due to the engagement of shoes 73 with the sides of the car, to swing shoes 74 down in clamping engagement against the upper surface of the top channels of the car side units. To withdraw the clamps from engagement with the car the valve handle 101 is shifted to a position above horizontal as shown in Figure 12 whereupon the source of air will flow through line 100 to the air motors and line 99 from the air motors will be open to the valve exhaust outlet 98. The gear mechanism including drive shaft 89 and driven shaft 86 will thus be turned in the opposite direction and will reverse the jacking drive to move the beams 67 away from the car. As the beams are thus being moved, clamp 72 will swing by gravity back to normal position and rack 102 will operate to actuate the mechanism associated therewith to move rod structure 109 downwardly so that by the time beams 67 approach gear housings 83 roller 111 will be moved downwardly sufficiently to force valve control handle 101 into horizontal shut-off position. The control rod structure 109 is arranged to control switch 112 forming a part of the circuit for controlling actuator mechanism for rotation of the jig. The arrangement is such that the jig cannot be rotated when the car is unclamped in the jig. This mechanical drive will apply equal movement of the clamp carrying beams insuring squaring up of the car and the pneumatic drive therefore will prevent undue pressure being applied to the sides of the car.

Cables 61 are actuated by a mechanism located in the pit 51 at the rotary jig stations. Electric motor 113 operates drive shafts 114 through gearing 114' and on the ends of the shafts are fixed drums 114 for actuating the cables. The cables are of sufficient length to rotate the jig at least 180° from its normal unloaded position. The cables are wrapped around the drums 114 and fixed to the rings 60 by conventional means.

Figures 22, 23, 24:
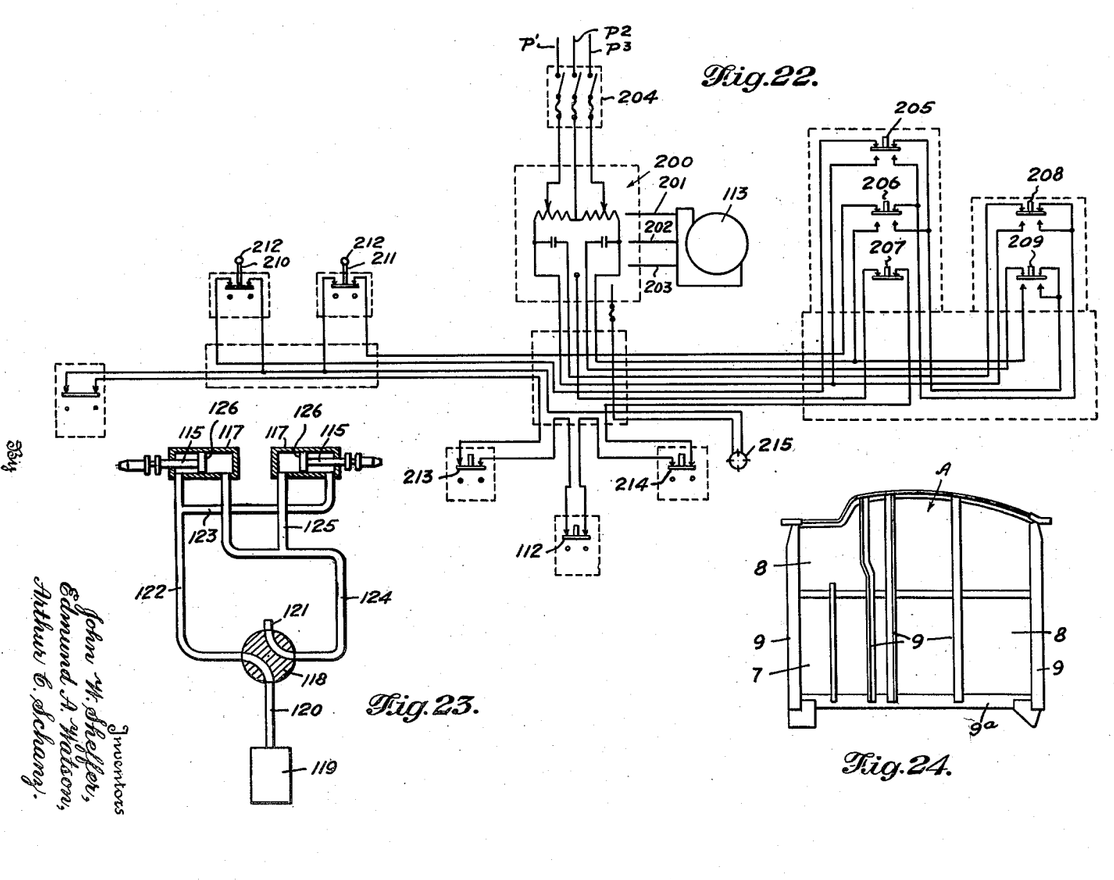
Figure 22 shows the wiring diagram for the electric system controlling rotation of one of the jigs.
Figure 23 is a diagrammatic view of the air control system for the jig locking plungers.
Figure 24 is an end elevation of a hopper car.
Figure 25:
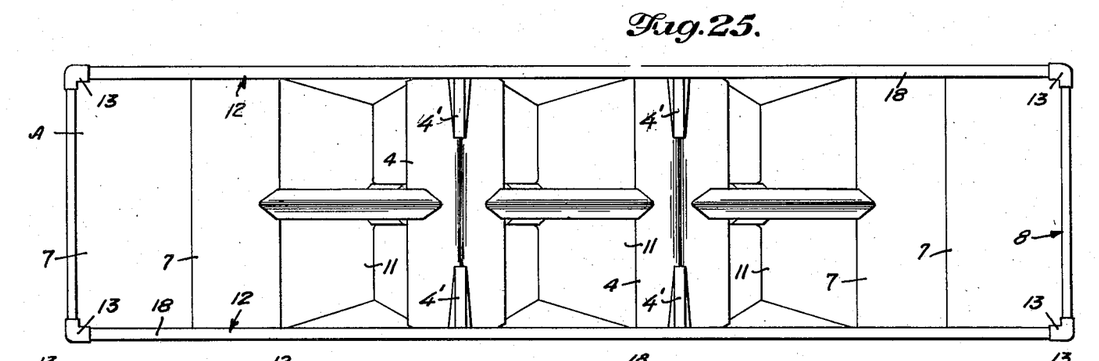
Figure 25 is a top plan view of the hopper car.
Figure 26:
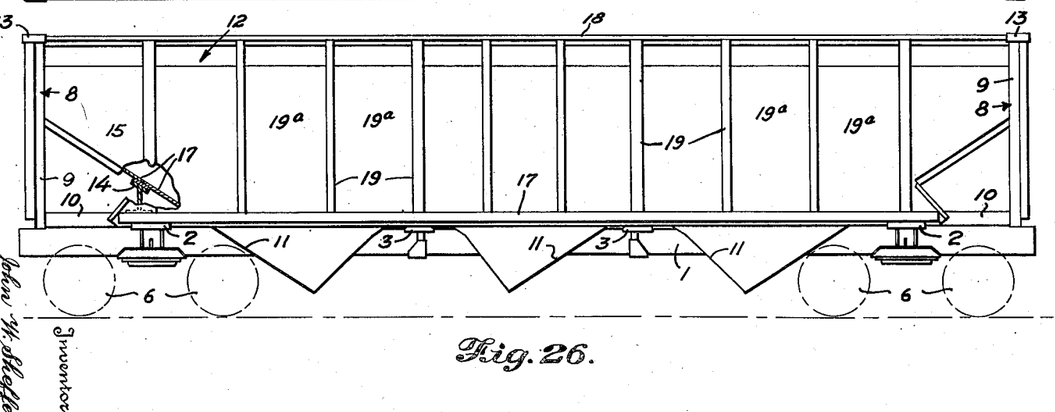
Figure 26 is a side elevational view of the hopper car.

In order to insure positioning of the jig in normal position for loading and unloading a car, a locking device is provided for association with each end ring structure of the jig. These devices are similar and each includes a plunger rod 115 for engaging in a recess in a bracket 116 suitably fixed to a ring 60. The plungers are connected with pistons 126 in cylinders 117 fixed on the flooring 50. In Figure 23 there is shown a system for controlling these locking devices. Four-way valve 118 is connected with a source of compressed air 119 by line 120 and has an exhaust outlet 121. Lines 122 and 123 connect the valve with the cylinders at one end of the pistons 126 and lines 124 and 125 connect the valve with the cylinders at the other ends of the pistons 126. When lines 122 and 123 are open to the source of compressed air, lines 124 and 125 will be open to the valve exhaust 121 and when lines 124 and 125 are open to the cylinders then lines 122 and 123 will be open to the valve exhaust 121. Thus by turning the valve the locking device 115 can be moved into the recesses in brackets 116 or removed therefrom. In this manner the rotatable framework can be kept locked against rotation until rotation is desired.

Figure 6:
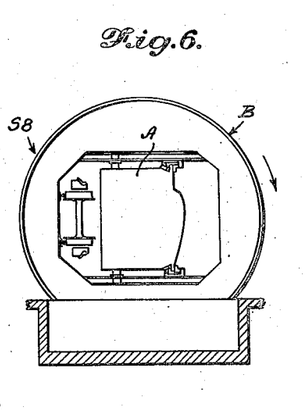
Figure 6 is an end view of the first rotary jig in the assembly line showing the car in position therein for welding.

A superstructure consisting of columns 170, longitudinal girders 171 and transverse girders 172 extend over the rotary jigs at stations S7, S8 and S9. The tacked together car is moved along the rails from station S6 to station S7. As the locking plungers 115 engage brackets 116 on the jig it will be locked in normal position so that the car can be moved along the tracks into the jig. While the jig is still locked, the jacking mechanism is put into operation to move the clamp bearing beams 67 toward the sides of the car and the clamps 71 and 72 will engage the sides to hold them in proper squared up relation. The electric motor 113 is started after the car is clamped to operate the mechanism for driving the drums 114 to thus cause the jig to be rotated to a position, as shown in Figure 6, where the car will be turned to place one side uppermost. While the car is held in this position the operators apply a ground to the car and use their electrodes inside and outside of the car for continuously welding the tacked together component parts of the car that can be reached with the electrode pointed toward the flooring, that is, in the direction of gravity. Some of the operators work outside of the car while others work inside of the car. Upon the completion of the welding operations at this station the electric motor for driving the drums 114 is put into operation to rotate the driving mechanism in reverse direction to thereby cause the drum to rotate reversely to its normal position. When the drum is in such position the locking plungers 115 are again engaged with brackets 116. Following this return of the jig to normal position, the air motors 93 are started up in reverse causing the jacking mechanism to move the beams 67 away from the car sides so that the clamps 71 and 72 will be retracted.

Figure 7:
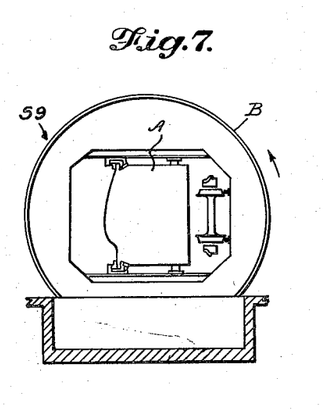
Figure 7 is an end view of the second rotary jig in the assembly line showing the car in another position for final welding.
Figure 8:
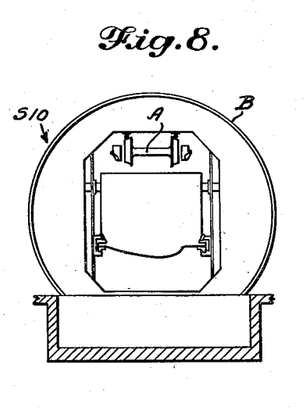
Figure 8 is an end view of the third rotary jig in the assembly line showing the car in upside down position for final welding.

The car is next moved from station S7 to station S8 and the jig is controlled in the same manner as at station S7 but is rotated to place the other side of the car in uppermost position as shown in Figure 7. At this station the operators again operate within and outside of the car to continuously arc weld the tacked together joints that can be reached with the electrodes pointed in the direction of gravity. Following this welding operation the jig is returned to normal position and the fixture is actuated to release the clamps. The car is then moved down the line to the third jig where the last final welding step takes place. At this station the jig is controlled in the same manner as the jigs were at stations S7 and S8 with the exception that the jig is rotated by the cables to place the bottom of the car in uppermost position as shown in Figure 8. While in this upside down position the operators again continuously final weld tacked together joints that can be reached from inside and outside of the car with their electrodes pointed in the direction of gravity. In the three positions in which the car is held in the rotary jigs all of the tacked together joints can be reached by the operators so that their work will all be of a down welding nature. Some of the operators use the stationary framework over the jigs for gaining their positions and ladders 173 can be utilized by the operators to reach the top of the stationary framework from which point they can descend and do their welding operations on the uppermost portions of the car.

Figures 1, 2:
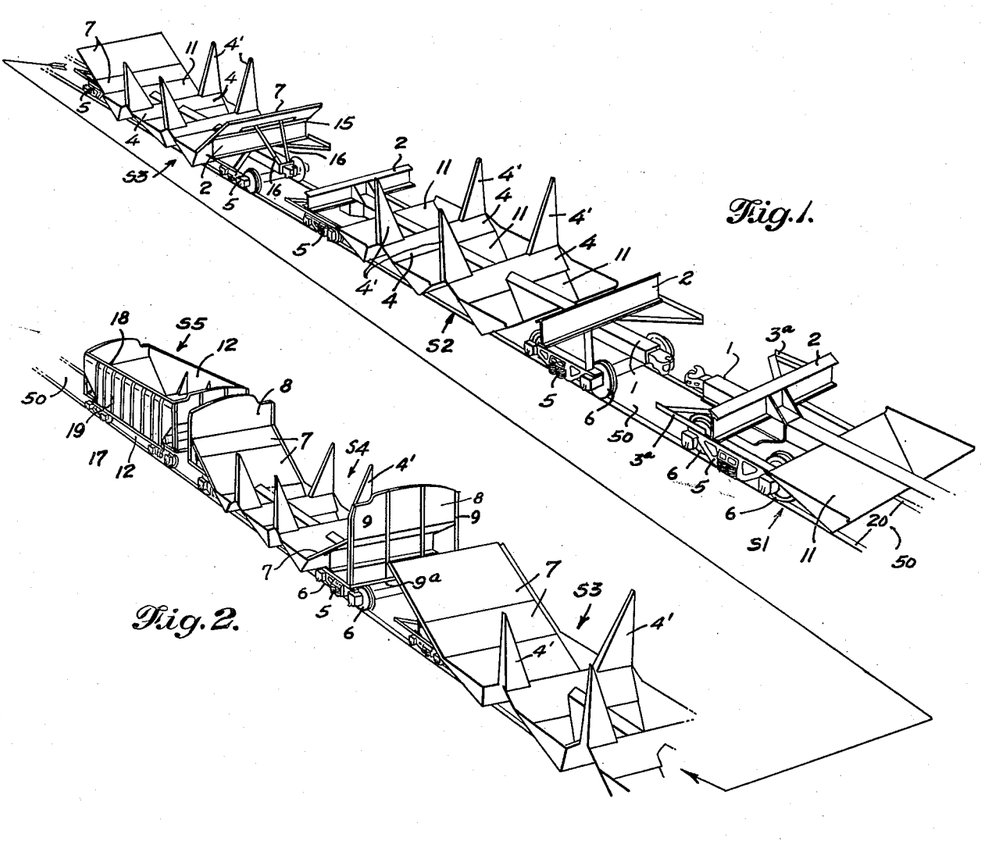
Figure 1 is a perspective view of the first portion of the assembly line for a hopper car.
Figure 2 is a continuation of the assembly line shown in Figure 1.
Figures 3, 4:
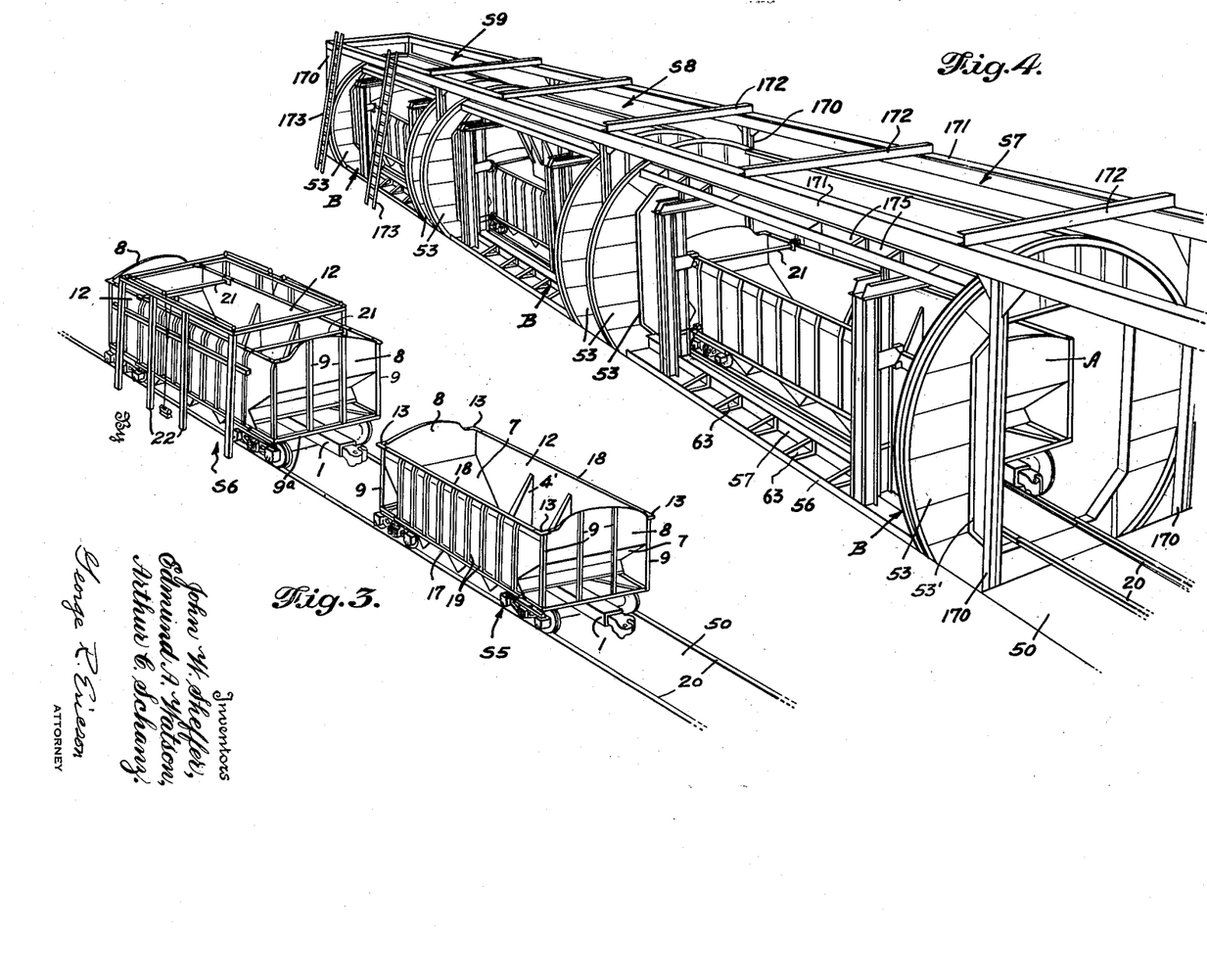
Figure 3 is a further continuation of the assembly line.
Figure 4 is the final portion of the assembly line.

Obviously the lower portion of the car will have considerably more weight than the upper portion and pockets are formed between the upper beams 55 and 54 for the reception of counterweight slugs 174, such pockets being closed by caps 175, see Figures 4 and 11. This counterweighting will reduce the power effort required for rotation and will provide a safety factor in the operation of the jig.

The control system for reversible electric motor 113 is shown in Figure 22. The motor is of the three phase A. C. type and power lines P', P² and P³ lead to a forward and reverse control switch 200 with which lines 201, 202 and 203 are connected. Extending between this switch and the motor in the power line is a main control switch 204. Forward switch 205, reverse switch 206 and stop switch 207 are manually actuated to control the operation of the motor. Vernier switches 208 and 209 are also included in the control system for causing small forward and reverse movements of the motor to rotate the jig from points approaching their positioning for the welding operation. The system also includes switch 112 previously referred to. Switches 210 and 211 are controlled by cams 212 on a jig ring 52 for cutting out the motor to prevent overtravel of the jig in its rotation to welding position. An emergency cut-out switch 213 for stopping the motor is also provided in the control system. Switch 214 is actuated by the jig locking device 115 to cut out the motor circuit while the jig is locked. Light 215 is connected in the circuit to give a signal when the jig is unlocked and the clamps are engaged whereby the operator will know when it is safe to start the electric motor to rotate the jig.

The switches are interconnected by wiring so that the motor can be started in desired direction and stopped with safety.

Switch 204 must be closed to operate the motor. Switch 205 is manually operated when the motor is to be driven forward, switch 206 is manually operated when the motor is to be driven in reverse and switch 207 is operated to stop the motor. As rod structure 109 operates switch 112 to open the circuit when the clamps in the jig are released from the car, the motor can operate only when the clamps engage the car. As one of the locking plungers 115 opens switch 214 when engaged with the bracket 116, the motor cannot be operated until the jig is unlocked. The control switches 205 or 206 are manually operated to cause the motor to rotate the jig and when the jig approaches the position to which it is rotating switch 205 or 206 whichever is utilized is released. The switches 208 or 209 are then utilized to intermittently energize the motor to jog the jig to final desired position of rotation. This jogging drive is necessary because the heavy tonnage being rotated makes it difficult to accurately stop the rotation at the desired point. Switches 210 and 211 are actuated by cams 212 located to limit the rotation of the jig beyond desired positions. Switch 213 is for an emergency when rotation of the jig must be stopped. The structure described herein forms the subject matter of a divisional application Serial No. 134,928 filed December 24, 1949.

The invention may be modified in various respects as will occur to those skilled in the art and the exclusive use of all modifications as come within the scope of the appended claims is contemplated.

What is claimed is:

1. The method of assembling a metal railroad car body progressively on track rails running adjacent fixed stations and through three rotatable stations consisting of tackwelding parts of the body in sufficient rigidity to maintain the parts in their proper relation, said parts being tackwelded in sequence at the fixed stations, rolling the car on its trucks to the first rotatable station, securing the car in the first rotatable station, transversely rotating the station so that one side of the car is uppermost whereby to present a plurality of upwardly facing seams for welding in the direction of gravity, continuously welding the upwardly facing seams of the car, rotating the station to place the car in the upright position, releasing the car from the station, rolling the car on its trucks to a second rotatable station, securing the car in the second rotatable station, transversely rotating the second rotatable station so that the other side of the car is uppermost, continuously welding the upwardly facing seams, rotating the second rotatable station to place the car in the upright position, releasing the car from the station, rolling the car on its trucks to the third rotatable station, securing the car in the third rotatable station, transversely rotating the station to place the car in the inverted position, and continuously welding the upwardly facing seams of the car, said car and truck being clamped in each rotatable station to maintain the car and truck structure in pre-determined relation with each other and in fixed relation with the station.

2. The method of assembling a metal railroad car progressively on track rails running adjacent fixed stations and through three rotatable stations comprising placing wheeled trucks on the rails, mounting a prefabricated underframe on the trucks, tackwelding the bottom units to the underframe at fixed stations, tackwelding end walls to the car structure at another fixed station, tackwelding prefabricated side walls to the car structure at another station, applying temporary transverse spacers to the top of the car between the side walls to retain the proper transverse dimension of the car during the continuous welding operation, advancing the tackwelded car to the first rotatable station, clamping the tackwelded car to the rails at the first rotatable station, transversely rotating the station so that one side of the car is uppermost whereby to present a plurality of upwardly facing seams for welding in the direction of gravity, continuously welding the upwardly facing seams of the car, rotating the station to place the car in the upright position, unclamping the car from the rails, advancing the car to a second rotatable station, clamping the car to the rails at the second rotatable station, transversely rotating the station so that the other side of the car is uppermost, continuously welding the upwardly facing seams of the car, rotating the second station to place the car in the upright position, unclamping the car from the rails, advancing the car into the third rotatable station, clamping the car to the rails at the third rotatable station, rotating the third station to place the car in the inverted position, continuously welding the upwardly facing seams of the car, rotating the third station to place the car in the upright position, and unclamping the car from the rails.

JOHN W. SHEFFER.
EDMUND A. WATSON.
ARTHUR C. SCHANZ.

References Cited in the file of this patent

UNITED STATES PATENTS

| Number | Name | Date |
| --- | --- | --- |
| 434,375 | Bryant | Aug. 12, 1890 |
| 1,740,033 | Pinckney | Dec. 17, 1929 |
| 1,772,735 | Romine | Aug. 12, 1930 |
| 1,940,785 | Boardman | Dec. 26, 1933 |
| 2,020,830 | Gray | Nov. 12, 1935 |
| 2,089,840 | Rockefeller | Aug. 10, 1937 |
| 2,117,435 | Langstroth | May 17, 1938 |
| 2,139,288 | Shipley | Dec. 6, 1938 |
| 2,140,268 | Moss | Dec. 13, 1938 |
| 2,142,109 | Burke | Jan. 3, 1939 |
| 2,164,567 | Burke | July 4, 1939 |
| 2,214,899 | Brown | Sept. 17, 1940 |
| 2,240,739 | Bishop | May 6, 1941 |
| 2,277,631 | Bullock | Mar. 24, 1942 |
| 2,301,636 | Nicol | Nov. 10, 1942 |
| 2,352,697 | Dittrich | July 4, 1944 |
| 2,405,793 | Lohse | Aug. 13, 1946 |
| 2,617,364 | Owens | Nov. 11, 1952 |

OTHER REFERENCES

Amer. Mach., January 30, 1947, p. 84.
Amer. Mach., February 12, 1948, 120–123.